Sept. 15, 1942.  R. E. BITTER  2,295,708
TOY BALLOON
Filed Sept. 2, 1939
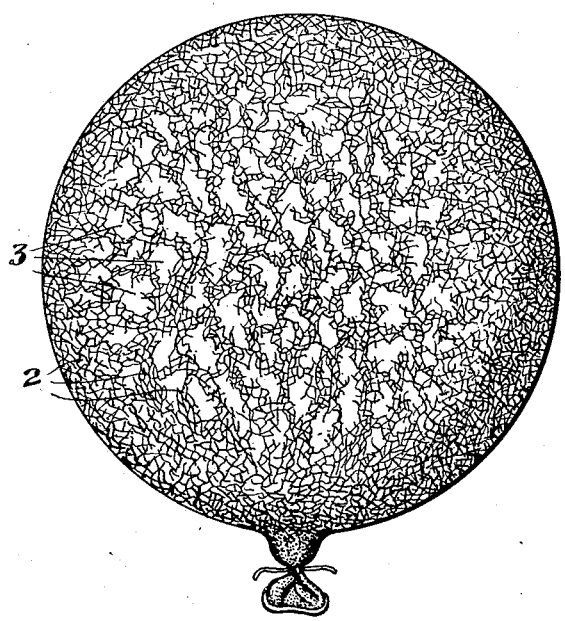

Patented Sept. 15, 1942

2,295,708

UNITED STATES PATENT OFFICE 2,295,708

TOY BALLOON

Raymond Edward Bitter, Cambridge, Mass., assignor to Vultex Chemical Company, Cambridge, Mass., a corporation of Massachusetts Application September 2, 1939, Serial No. 293,275

5 Claims. (Cl. 46—87)

This invention relates to the manufacture of toy balloons and other inflatable articles which can be made by essentially the same methods and which, therefore, are hereinafter included in the term "toy balloons."

It is the chief object of the invention to devise an article of this character which will have novel and pleasing color tone effects and combinations.

According to a preferred method of making the novel product embodying this invention a balloon form of glass, aluminum, or other material, is coated with rubber by any suitable method, such as those commonly practiced in the manufacture of articles of this character. Usually a rubber deposit is built up on the form either by dipping it in a liquid rubber composition and spinning the form so as to distribute the material while it dries, or by dipping it first into a developer or coagulant and then immersing it in a rubber composition, a spinning, or some other suitable method of distributing the deposit, also being utilized. So far as the present invention is concerned, no change in the method of producing this built-up film on the form is required, and the coating so produced is allowed to dry or set up to an irreversible condition.

The rubber film so produced on it is next dipped in another liquid rubber composition and the coating so picked up is distributed evenly by rotating the form, or in any other convenient manner. While this film is still wet, the form is plunged into a crinkling or wrinkling solution. It is held in the liquid until the desired depth of wrinkling has been produced, whereupon it is removed and the film is washed and dried in the usual manner. The ring may be rolled at any convenient stage in the process, preferably at some time during the rest period between the first and second dips.

The nature of the rubber compositions in which the form is dipped will be obvious to those skilled in this art. The best results are produced with compositions of latex, either vulcanized or unvulcanized, the former, however, generally being preferred, and these materials may be modified in accordance with the customs in the trade to produce dipping compositions of suitable consistency and viscosity and to give a film having the desired strength, texture and color.

The wrinkling solution may be simply a rubber solvent, such as benzol, naphtha, hexalin, kerosene, and others. Excellent results have been produced with ethylene dichloride. Acid solvents may, however, be used, and are sometimes found preferable, depending upon the nature of the rubber composition or the manner in which the initial film is built up. Similar effects, also, may be obtained by the addition of latex coagulants to the solvent employed. Examples of such coagulants are acetone, alcohol, organic acids, or the salts of bi and trivalent metals.

The colors of the compositions used in producing the two films or coats will depend upon the nature of the effects desired. For example, strongly contrasting colors, such as red and green or blue and white, may be used for the respective coats, in which event the final result is a multicolor effect varying with the depth of wrinkling. This may be made of such a mild degree that after the balloon has been completed and is inflated, the color of the under-coat is visible merely through the thin or less dense parts of the outer layer or coating. Or, the wrinkling effect may be allowed to proceed further so that it will rupture the outer layer and give a broken, interrupted, and irregular pattern, the nature of which may vary widely in character. In general, and with fairly active solvents, the wrinkling initially is a fine or small figured pattern, and it deepens as its exposure to the action of the solvent continues in point of time. Stronger or more active solvents produce a coarser, more rapid wrinkling, so that the strength of the solvent and the intensity of its attack on the wet rubber coating, affords one means of control of the ultimate effect. Another control is afforded by the degree of setting which the second coat is allowed to assume before it is plunged into the solvent or wrinkling liquid. If the over dip is allowed to dry, no permanent wrinkling results. Under normal atmospheric drying conditions a brief time period of, say, from thirty to sixty seconds, is necessary in order to produce typical wrinkling effects.

If the two dips are of the same color, a two-tone color effect of lighter and darker shades will result. In fact, this effect can be produced by dipping the base coat in the crinkling solvent before it has completely set up or, in other words, while the rubber on the outer surface is still in a liquid phase. This effect is better obtained when the method of building up the deposit proceeds with the use of an initial dip in a coagulant or developer. It has the disadvantage, however, of requiring more careful timing than the preferred combination of a base coat with an overdip, as above described. In this connection, also, it may be pointed out that when the latter method is used it is preferable to make the wall thickness of the base coat slightly thinner than that required for the finished article so that the additional thickness supplied by the overdip will produce a total wall thickness substantially equal to that of balloons of the common commercial forms and the inflation characteristics, therefore, will not be altered.

In general, it may be observed that the depth and complexity of the wrinkling varies inversely with the dryness or irreversibility of the deposit, the wetter the deposit the deeper the wrinkling. Also, that more uniform results are ordinarily obtained with deposits from a developer process, and that when straight dipping or coagulant deposits are used an acidified crinkling solvent is usually preferable. The developer method of build up also has the advantage of affording a greater time interval between the second dip and the immersion into the crinkling solvent as compared with the coagulation method of build up of the first coat.

In the accompanying drawing applicant has endeavored to illustrate a typical toy balloon embodying this invention, the balloon being shown in an inflated condition. The wrinkled portions of the outer coating are indicated at 2 and the smooth surfaces of the underlying coat are shown at 3. It is impossible, however, to portray merely by black ink lines much idea of the effects obtainable with this invention.

A wide variety of effects may be produced by varying the combination of the base coat and the overdip, the base coat, for example, being a modified stock and the overdip an unmodified composition. Also, combinations of raw latex, vulcanized latex, and modified latex of either the unvulcanized or vulcanized type may be employed in either dip with or without a deposition agent such as a developer or a coagulant.

Having thus described my invention, what I desire to claim as new is:

1. A toy balloon comprising inner and outer layers of differently colored rubber, the two being united into a substantially integral structure and the outer of said layers being wrinkled, the under layer being relatively smooth and substantially non-wrinkled, whereby when the article is inflated a two-tone color effect is produced.

2. A toy balloon comprising superposed layers of rubber of different colors united into a substantially integral structure and the outer of said layers being wrinkled, the under layer being relatively smooth and substantially non-wrinkled, whereby when the article is inflated a multi-color effect is produced.

3. A toy balloon comprising superposed layers of rubber of different colors united into a substantially integral structure, the outer of said layers being wrinkled to a depth sufficient to break through the outer layer and expose portions of the layer underlying it when the balloon is inflated, the latter layer being substantially smooth and unwrinkled.

4. A toy balloon comprising inner and outer layers of differently colored rubber, the two being united into a substantially integral structure, the inner of said layers having substantially the thickness and strength required for a toy balloon and being relatively smooth and substantially non-wrinkled, the outer layer being wrinkled and thereby presenting thin or broken portions in an irregular pattern, when inflated, through which the color of the inner layer is visible, whereby the inflated article presents a two-tone color effect.

5. A toy balloon comprising superposed layers of rubber of different colors united into a substantially integral structure and the outer of said layers consisting of vulcanized latex rubber, said outer layer being wrinkled and thereby broken or interrupted in an irregular pattern, thus exposing portions of the underlying layer when the article is inflated, the latter layer being substantially smooth and unwrinkled.

RAYMOND EDWARD BITTER.